US008145474B1

(12) United States Patent
Daily et al.

(10) Patent No.: US 8,145,474 B1
(45) Date of Patent: Mar. 27, 2012

(54) COMPUTER MEDIATED NATURAL LANGUAGE BASED COMMUNICATION AUGMENTED BY ARBITRARY AND FLEXIBLY ASSIGNED PERSONALITY CLASSIFICATION SYSTEMS

(75) Inventors: Daniel J. Daily, Westminster, CO (US); Christopher R. Gentle, Gladesville (AU); Lisa Y. Kawahara, Colorado Springs, CO (US); Ashis Maity, Arvada, CO (US); Michael J. Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 818 days.

(21) Appl. No.: 11/962,821

(22) Filed: Dec. 21, 2007

Related U.S. Application Data

(60) Provisional application No. 60/871,673, filed on Dec. 22, 2006.

(51) Int. Cl.
G06F 17/21 (2006.01)
G06F 15/00 (2006.01)
G10L 11/00 (2006.01)

(52) U.S. Cl. ............... 704/9; 704/10; 704/270; 704/275

(58) Field of Classification Search ................ 704/9, 10, 704/275
See application file for complete search history.

(56) References Cited

U.S. PATENT DOCUMENTS

| 5,161,158 A | 11/1992 | Chakravarty et al. |
| 5,276,776 A | 1/1994 | Grady et al. |
| 5,542,024 A | 7/1996 | Balint et al. |
| 5,546,507 A | 8/1996 | Staub |
| 5,678,039 A | 10/1997 | Hinks et al. |
| 5,720,008 A | 2/1998 | McGuinness et al. |
| 5,774,850 A * | 6/1998 | Hattori et al. ................. 704/250 |
| 5,805,808 A | 9/1998 | Hasani et al. |
| 5,809,212 A | 9/1998 | Shasha |
| 5,812,851 A | 9/1998 | Levy et al. |
| 5,845,283 A | 12/1998 | Williams et al. |
| 5,974,405 A | 10/1999 | McGuinness et al. |
| 6,040,789 A | 3/2000 | Nishida et al. |
| 6,327,587 B1 | 12/2001 | Forster et al. |
| 6,374,261 B1 | 4/2002 | Alvarez et al. |
| 6,408,350 B1 | 6/2002 | Kawamura et al. |
| 6,490,371 B1 | 12/2002 | Aoki et al. |
| 6,523,172 B1 * | 2/2003 | Martinez-Guerra et al. . 717/143 |
| 6,549,918 B1 | 4/2003 | Probert, Jr. et al. |

(Continued)

FOREIGN PATENT DOCUMENTS
WO  WO 98/14017  4/1998
(Continued)

OTHER PUBLICATIONS

Schmidt "Denotational Semantics—A Methodology for Language Development", Allyn and Bacon, Inc., 1986, 344 pages.

(Continued)

Primary Examiner — Justin Rider
(74) Attorney, Agent, or Firm — Sheridan Ross P.C.

(57) ABSTRACT

The present invention is directed, in one embodiment, to an system that lexically analyzes a behavior-descriptive input stream to provide a tokenized equivalent, syntactically parses the tokenized equivalent to provide a parser output, semantically analyzes the parser output to provide an indication of at least one of a behavior and type of behavior described by the input stream, and, based on the indication, selects an appropriate response.

28 Claims, 6 Drawing Sheets

U.S. PATENT DOCUMENTS

| | | | |
|---|---|---|---|
| 6,598,020 B1 * | 7/2003 | Kleindienst et al. | 704/270 |
| 6,601,058 B2 | 7/2003 | Forster et al. | |
| 6,721,706 B1 * | 4/2004 | Strubbe et al. | 704/275 |
| 6,807,585 B2 | 10/2004 | Kovacevic | |
| 6,886,166 B2 | 4/2005 | Harrison et al. | |
| 7,035,335 B1 | 4/2006 | Iacobelli et al. | |
| 7,089,218 B1 * | 8/2006 | Visel | 706/14 |
| 7,093,292 B1 | 8/2006 | Pantuso | |
| 7,187,694 B1 | 3/2007 | Liao | |
| 7,233,597 B2 | 6/2007 | Kumar et al. | |
| 7,337,314 B2 | 2/2008 | Hussain et al. | |
| 7,366,961 B1 | 4/2008 | Kovacevic et al. | |
| 7,391,735 B2 | 6/2008 | Johnson | |
| 7,434,225 B2 | 10/2008 | Groetzner et al. | |
| 7,463,630 B2 | 12/2008 | Lee | |
| 7,551,575 B1 | 6/2009 | Aleksandrowicz | |
| 7,657,933 B2 | 2/2010 | Hussain et al. | |
| 7,661,130 B2 | 2/2010 | Hussain et al. | |
| 7,680,037 B2 | 3/2010 | Cortes et al. | |
| 7,724,740 B1 | 5/2010 | Wang et al. | |
| 7,873,992 B1 * | 1/2011 | Daily et al. | 726/11 |
| 2003/0191625 A1 * | 10/2003 | Gorin et al. | 704/1 |
| 2003/0222977 A1 | 12/2003 | Yoshino | |
| 2004/0010780 A1 | 1/2004 | Garvin | |
| 2004/0042470 A1 | 3/2004 | Cooper et al. | |
| 2005/0004942 A1 | 1/2005 | Madsen et al. | |
| 2005/0033632 A1 * | 2/2005 | Wu et al. | 705/10 |
| 2005/0080628 A1 * | 4/2005 | Kuperstein | 704/270.1 |
| 2005/0278340 A1 | 12/2005 | Rehberg et al. | |
| 2007/0033005 A1 * | 2/2007 | Cristo et al. | 704/9 |

FOREIGN PATENT DOCUMENTS

| | | |
|---|---|---|
| WO | WO 03/052688 | 6/2003 |

OTHER PUBLICATIONS

"Parsing" Wikipedia, available at http://en.wikipedia.org/wiki/Parsing, printed Nov. 1, 2007, pp. 1-6.
"Chart parser", Wikipedia, available at http://en.wikipedia.org/wiki/Chart_parser, printer Nov. 1, 2007, pp. 1-2.
"Deterministic parsing", Wikipedia, available at http://en.wikipedia.org/wiki/Deterministic_parsing, printed Nov. 1, 2007, 1 page.
"Shallow parsing", Wikipedia, available at http://en.wikipedia.org/wiki/Shallow_parsing, printed Nov. 1, 2007, 1 page.
"Compiler-compiler", Wikipedia, available at http://en.wikipedia.org/wiki/Compiler-compiler, printed Nov. 1, 2007, pp. 1-3.
"Parsing expression grammar", Wikipedia, available at http://en.wikipedia.org/wiki/Parsing_expression_grammar, printed Nov. 1, 2007, pp. 1-8.
U.S. Appl. No. 10/728,730, filed Dec. 4, 2003, Daily et al.
"Bottom-up parsing", Wikipedia, available at http://en.wikipedia.org/wiki/Bottom-up_parsing, printed Nov. 1, 2007, pp. 1-7.
"Grammar", Wikipedia, available at http://en.wikipedia.org/wiki/Grammar, printed Nov. 1, 2007, pp. 1-4.
"Context-free grammar", Wikipedia, available at http://en.wikipedia.org/wiki/Context-free_grammar, printed Nov. 1, 2007, pp. 1-10.
"Formal grammar", Wikipedia, available at http://en.wikipedia.org/wiki/Formal_grammar, printed Nov. 1, 2007, pp. 1-7.
"Attribute grammar", Wikipedia, available at http://en.wikipedia.org/wiki/Attribute_grammar, printed Nov. 1, 2007, pp. 1-2.
"Lexical analysis", Wikipedia, available at http://en.wikipedia.org/wiki/Lexical_analysis, printed Nov. 1, 2007, pp. 1-6.
"Lexicon", Wikipedia, available at http://en.wikipedia.org/wiki/Lexicon, printed Nov. 1, 2007, pp. 1-2.
"Syntax", Wikipedia, available at http://en.wikipedia.org/wiki/SYNTAX, printed Nov. 1, 2007, pp. 1-2.
"Syntactic predicate", Wikipedia, available at http://en.wikipedia.org/wiki/Syntactic_predicate, printed Nov. 1, 2007, pp. 1-7.
"Symbol", Wikipedia, available at http://en.wikipedia.org/wiki/Symbol, printed Nov. 1, 2007, pp. 1-3.
"Regular expression", Wikipedia, available at http://en.wikipedia.org/wiki/Regular_expression, printed Nov. 1, 2007, pp. 1-12.
"Regular expression examples", Wikipedia, available at http://en.wikipedia.org/wiki/Regular_expression_examples, printed Nov. 1, 2007, pp. 1-6.
"Regular language", Wikipedia, available at http://en.wikipedia.org/wiki/Regular_language, printed Nov. 1, 2007, pp. 1-5.
"Semantics", Wikipedia, available at http://en.wikipedia.org/wiki/Semantics, printed Nov. 1, 2007, pp. 1-8.
"General semantics", Wikipedia, available at http://en.wikipedia.org/wiki/General_semantics, printed Nov. 1, 2007, pp. 1-10.
"Denotational semantics", Wikipedia, available at http://en.wikipedia.org/wiki/Denotational_semantics, printed Nov. 1, 2007, pp. 1-10.
"Operational semantics", Wikipedia, available at http://en.wikipedia.org/wiki/Operational_semantics, printed Nov. 1, 2007, pp. 1-2.
"Lexical semantics", Wikipedia, available at http://en.wikipedia.org/wiki/Lexical_semantics, printed Nov. 1, 2007, pp. 1-2.
"Parsing table", Wikipedia, available at http://en.wikipedia.org/wiki/Parsing_table, printed Nov. 1, 2007, pp. 1-3.
"Terminal and nonterminal symbols", Wikipedia, available at http://en.wikipedia.org/wiki/Terminal_and_nonterminal_symbols, printed Nov. 1, 2007, 1 page.
"Production rule", Wikipedia, available at http://en.wikipedia.org/wiki/Production_rule, printed Nov. 1, 2007, 1 page.
"Abstract syntax tree", Wikipedia, available at http://en.wikipedia.org/wiki/Abstract_syntax_tree, printed Nov. 1, 2007, pp. 1-2.
"Operator", Wikipedia, available at http://en.wikipedia.org/wiki/Operator, printed Nov. 1, 2007, pp. 1-7.
"Parse tree", Wikipedia, available at http://en.wikipedia.org/wiki/Parse_tree, printed Nov. 1, 2007, pp. 1-2.
"Compilers: Principles, Techniques, and Tools", Wikipedia, available at http://en.wikipedia.org/wiki/Compilers:_Principles%2C_Techniques%2C_and_Tools, printed Nov. 1, 2007, pp. 1-3.
"LR parser", Wikipedia, available at http://en.wikipedia.org/wiki/LR_parser, printed Nov. 1, 2007, pp. 1-13.
"LL parser", Wikipedia, available at http://en.wikipedia.org/wiki/LL_parser, printed Nov. 1, 2007, pp. 1-7.
"LALR parser", Wikipedia, available at http://en.wikipedia.org/wiki/LALR_parser, printed Nov. 1, 2007, pp. 1-2.
"Earley parser", Wikipedia, available at http://en.wikipedia.org/wiki/Earley_parser, printed Nov. 1, 2007, pp. 1-4.
"Recursive descent parser", Wikipedia, available at http://en.wikipedia.org/wiki/Recursive_descent_parser, printed Nov. 1, 2007, pp. 1-6.
"GLR parser", Wikipedia, available at http://en.wikipedia.org/wiki/GLR_parser, printed Nov. 1, 2007, pp. 1-2.
"Tail recursive parser", Wikipedia, available at http://en.wikipedia.org/wiki/Tail_recursive_parser, printed Nov. 1, 2007, pp. 1-3.
"Lemon parser", Wikipedia, available at http://en.wikipedia.org/wiki/Lemon_parser, printed Nov. 1, 2007, 1 page.
"Inverse parser", Wikipedia, available at http://en.wikipedia.org/wiki/Inverse_parser, printed Nov. 1, 2007, 1 page.
"Simple LR parser", Wikipedia, available at http://en.wikipedia.org/wiki/Simple_LR_parser, printed Nov. 1, 2007, pp. 1-3.
"Canonical LR parser", Wikipedia, available at http://en.wikipedia.org/wiki/Canonical_LR_parser, printed Nov. 1, 2007, pp. 1-4.
"Spirit Parser Framework", Wikipedia, available at http://en.wikipedia.org/wiki/Spirit_Parser_Framework, printed Nov. 1, 2007, pp. 1-3.
"GOLD (parser)", Wikipedia, available at http://en.wikipedia.org/wiki/GOLD_%28parser%29, printed Nov. 1, 2007, pp. 1-5.
"DKP Log Parser", Wikipedia, available at http://en.wikipedia.org/wiki/DKP_Log_Parser, printed Nov. 1, 2007, pp. 1-3.
"Operator-precedence parser", Wikipedia, available at http://en.wikipedia.org/wiki/Operator-precedence_parser, printed Nov. 1, 2007, pp. 1-5.
"LALR Parser Generator", Wikipedia, available at http://en.wikipedia.org/wiki/LALR_Parser_Generator, printed Nov. 1, 2007, pp. 1-2.
"Simple precedence parser", Wikipedia, available at http://en.wikipedia.org/wiki/Simple_precedence_parser, printed Nov. 1, 2007, pp. 1-3.
"Top-down parsing", Wikipedia, available at http://en.wikipedia.org/wiki/Top-down_parsing, printed Nov. 1, 2007, pp. 1-2.
"List of parser generators", Wikipedia, available at http://en.wikipedia.org/wiki/List_of_parser_generators, printed Nov. 1, 2007, pp. 1-5.

"Left recursion", Wikipedia, available at http://en.wikipedia.org/wiki/Left_recursion, printed Nov. 1, 2007, pp. 1-6.
"Recursion (computer science)", Wikipedia, available at http://en.wikipedia.org/wiki/Recursion_%28computer_science%29, printed Nov. 1, 2007, pp. 1-6.
"What's your email personality?", iVillage.co.uk, available at http://quiz.ivillage.com/uk_work/tests/emailpersonality.htm, cite updated Mar. 29, 2005, pp. 1-2.
"Alternative Medicine for a Healthy You . . . ", J.E. Ellis-Rhinoweb FX, available at http://www.kent.net/Healthyou/Books.htm, updated Jan. 25, 2006, pp. 1-5.
Berghofer "Proofs, Programs and Executable Specifications in Higher Order Logic", available at http://deposit.ddb.de/cgi-bin/dokserv?idn=969627661&dok_var=d1&dok_ext=pdf&filename=969627661.pdf, Jun. 18, 2003, 175 pages.
Maksimova "Deception and its detection in computer-mediated communication", Iowa State University, Dec. 31, 2005, pp. 1-30.
Reeves "The Benefits of Interactive Online Characters", Stanford University, available at http://www.eidoserve.com/eido_blue/docs/Stanford_Avatar_Study.pdf, date unkonwn, pp. 1-11.
Kummerow et al., "Interpretive Guide for the MBTI Expanded Analysis Report", Consulting Psychologists Press, Inc., 1992, 73 pages.
Briggs et al., "Myers-Briggs Type Indicator", Consulting Psychologists Press, Inc., 1990, 7 pages.
Bacon "Effective People Skills", Lore International Institute, 1999, 134 pages.
Bacon "Leadership through Influence", Lore International Institute, 1994, 161 pages.
Myers et al., "MBTI Manual A Guide to the Development and Use of the Myers-Briggs Type Indicator", Consulting Psycologists Press, Inc., 1998, 441 pages.
Caneel "Social Signaling in Decision Making", Massachusetts Institute of Technology, Jun. 2005, pp. 1-60.
"Automatic E-Mail Distributors," Computer Telephony, Nov. 1998, vol. 6(11), pp. 143-144.
"Descriptive complexity", Wikipedia, available at http://en.wikipedia.org/wiki/Descriptive_complexity, printed Nov. 1, 2007, pp. 1-2.
"Dynamic logic (modal logic)", Wikipedia, available at http://en.wikipedia.org/wiki/Dynamic_logic_%28modal_logic%29, printed Nov. 1, 2007, pp. 1-9.
"Expert system", Wikipedia, available at http://en.wikipedia.org/wiki/Expert_system, printed Nov. 1, 2007, pp. 1-13.
U.S. Appl. No. 11/962,799, filed Dec. 21, 2007, Daily et al.
"First-order logic", Wikipedia, available at http://en.wikipedia.org/wiki/First-order_logic, printed Nov. 1, 2007, pp. 1-18.
"Fuzzy logic", Wikipedia, available at http://en.wikipedia.org/wiki/Fuzzy_logic, printed Nov. 1, 2007, pp. 1-11.
"Higher-order logic", Wikipedia, available at http://en.wikipedia.org/wiki/Higher-order_logic, printed Nov. 1, 2007, pp. 1-2.
"Index of Isabelle/HOL" (Oct. 2005), available at http://isabelle.in.tun.de/library/HOL/index.html, 2 pages.
"Isabelle/HOL-Higher-Order Logic", Institut fur Informatik TU Munchen, (2005), 430 pages.
"Logic", Wikipedia, available at http://en.wikipedia.org/wiki/Logic, printed Nov. 1, 2007, pp. 1-13.
"Mathematical logic", Wikipedia, available at http://en.wikipedia.org/wiki/Mathematical_logic, printed Nov. 1, 2007, pp. 1-5.
"Non-Monotonic Logic", Stanford Encyclopedia of Philosophy, available at http://plato.stanford.edu/entries/logic-nonmonotonic/, printed May 1, 2006, pp. 1-14.
"Predicate logic", Wikipedia, available at http://en.wikipedia.org/wiki/Predicate_logic, printed Nov. 1, 2007, 1 page.
"Second-order arithmetic", Wikipedia, available at http://en.wikipedia.org/wiki/Second-order_arithmetic, printed Nov. 1, 2007, pp. 1-8.
"Second-order logic", Wikipedia, available at http://en.wikipedia.org/wiki/Second-order_logic, printed Nov. 1, 2007, pp. 1-8.
"Semantics of logic", Wikipedia, available at http://en.wikipedia.org/wiki/Semantics_of_logic, printed Nov. 1, 2007, pp. 1-2.
"What is Isabelle?", available at http://www.cl.cam.ac.uk/Research/HVG/Isabelle/, University of Cambridge Computer Library, updated Apr. 29, 2005, pp. 1-3.
Allport et al., "Teaching the Computer to Understand," IEEE/IEE, 1988 pp. 8/1-8/2.
Bacon "Leadership through Influence", Lore International Institute, 1994, pp. 1-161.
Barkai "Automatic Generation of a Diagnostic Expert System from Failure Mode and Effects Analysis (FMEA) Information", available at http://www.fmeainfocentre.com/download/SAE99.pdf, International Congress and Exposition, Detroit Michigan, Mar. 1-4, 1999, pp. 1-6.
Benzmuller et al., "Can a Higher-Order and a First-Order Theorem Prover Cooperate?", Springer-Verlag, available at http://www.cs.bham.ac.uk/~mmk/papers/05-LPAR.html, 2005, pp. 1-21.
Berghofer "Program extraction in Isabelle", available at http://www4.In.tum.de/~berghofe/papers/TYPES2002_slides.pdf, date unknown, pp. 1-27.
Brucker et al., "HOL-TestGen 1.0.0 User Guide," Information Security, ETH Technical Report 482, Apr. 2005, pp. 1-50.
Chander et al., "Using Goals to Design and Verify Rule Bases," Decision Support Systems, 1997, vol. 21, pp. 281-305.
Chander, P. G., "On the Design and Evaluation of Rule-Based Systems," Ph.D. thesis, Department of Computer Science, Concordia University, Montreal, Quebec, Canada, Jun. 1996.
DeBenham, "A Structure for Expert Systems Maintenance," Expert Systems with Applications, 1996, vol. 11, No. 4, pp. 553-559.
DeBenham, J., "Expert Systems Designed for Maintenance," Expert Systems with Applications, 1992, vol. 5, pp. 233-244.
Frohlich et al., "Using Extended Logic Programming for Alarm-Correlation in Cellular Phone Networks", available at http://www.biotec.tu-dresden.de/schroeder/group/papers/sch_iea99.pdf date unknown, 12 pages.
Gupta, U., "Validation and Verification of Knowledge-Based Systems: A Survey," Journal of Applied Intelligence, 1993, vol. 3, No. 4, pp. 343-363.
Hamburger et al., "A Decentralized AI System for Transcript Applications," IEEE, 1990, pp. 48-53.
Hurd et al., "Probablistic Guarded Commands Mechanized in HOL," Theoretical Computer Science, 2005, vol. 346, pp. 96-112.
Nipkow et al., "Isabelle/HOL: A Proof Assistant for Higher-Order", published by Springer-Verlag, Feb. 26, 2002, 231 pages.
Preece, A., "A New Approach to Detecting Missing Knowledge in Expert System Rule Bases," International Journal of Man Machine Studies, 1993, vol. 38, No. 4, pp. 661-688.
Tan, M., "Telecommunications," The Handbook of Applied Expert Systems, Edited by Jay Liebowitz, CRC Press, 1997, pp. 24-1-24-12.
Yang et al., "Nemos: A Framework for Axiomatic and Executable Specifications of Memory Consistency Models," International Parallel and Distributed Processing Symposium, 2004, pp. 1-15.
Zhang et al. "A Novel Architecture for an Integrated Fault Diagnostic/Prognostic System," AAAI Technical Report SS-02-03, Spring 2002, 9 pages.

* cited by examiner

COMPUTER MEDIATED NATURAL LANGUAGE BASED COMMUNICATION AUGMENTED BY ARBITRARY AND FLEXIBLY ASSIGNED PERSONALITY CLASSIFICATION SYSTEMS

CROSS REFERENCE TO RELATED APPLICATION

The present application claims the benefits of U.S. Provisional Application Ser. No. 60/871,673, filed Dec. 22, 2006, entitled "HIGHER ORDER LOGIC APPLIED TO EXPERT SYSTEMS FOR ALARM ANALYSIS, FILTERING, CORRELATION, AND ROOT CAUSE", which is incorporated herein by this reference in its entirety.

FIELD OF THE INVENTION

The invention relates generally to behavioral identification and/or analysis systems and particularly to computer-mediated communication.

BACKGROUND OF THE INVENTION

Many studies have established that people frequently have differing perceptions and comprehensions of natural language. These differing perceptions and comprehensions are based on a variety of factors, including native intelligence, education background, family background, culture, nationality, ethnicity, and personality type. As a result of these differing perceptions and comprehensions, expected and unexpected positive and negative consequences to the communicator can result.

The communication obstacles resulting from personality have been the source of a myriad of personality classification systems, each with differing purposes. Jungian *Psychological Type*, on which the following personality classification systems are based to varying degrees, was derived from the clinical environment and applied to psychopathology. Keirsey-Bates (Please Understand Me) and Keirsey (Portraits of Temperament) are intended to help with understanding our own and other's behavior. Of interest to the business environment, and the mediation of communication between manager and managed, is the second Keirsey reference that provides a useful classification of either role director or role informative. Role directors tend to define roles for themselves and others, and cast others into roles, whereas role informatives tend to wait for others to propose roles for them. Also, such relationships are not uncommon among peers. *Full Spectrum Leadership* (Eilers and Carabello) is used to develop different leadership styles and define the best problem domains of application for each style. Myers-Briggs is widely used to help identify an individual's life and career goals, and for conflict resolution within organizations, among organizations, among individuals, and in family settings.

Individuals tend to have different preferred styles of communication and interaction based on their personality type. Conflict often arises from these differences. Myers-Briggs is used in the following discussion, because it is the most systematically developed, and can be mapped both isomorphically and homomorphically to the above mentioned classification systems. The terms used are specific to Myers-Briggs and lack their common English definition. Also, they do not have any pejorative connotation. Again, owing to the brevity of the following, some inaccuracies are inevitable.

Myers-Briggs assigns preference in regards to the functions classified as Introversion/Extroversion, Sensing/Intuition, Thinking/Feeling, and Judging/Perceiving. Each of the following functions has an introverted or extroverted form: Sensing, Intuition, Thinking, Feeling. The introverted form applies to a sort of personal sensation as opposed to being directed towards the outer world. There is also a preferred priority with which an individual uses each introverted/extroverted function, and a degree of skill with each function that the individual has achieved, e.g., through life experience.

Introversion is a preference for inner experience and reflection. Extroversion is a preference for action in the outer world and to "talk things out." Conflicts may arise between these types when the introvert prefers some time to think things over, while the extravert pursues the introvert to achieve a face-to-face meeting to talk things out.

Sensing/Intuition refer to an individual's preferred mode of taking in information. Sensing types prefer observation of concrete bottom-up sequential detail. Intuitive types prefer a "big picture view" and top-down classification. Strongly sensing types may have some difficulty apprehending the abstraction and metaphor preferred by intuitive types. Strongly intuitive types may have difficulty coping with details that are not readily classifiable and whose lack of conceptual framework is unimportant to sensing types.

Thinking/Feeling refers to an individual's preferred mode of making decisions. Thinking types prefer to abide by rules and laws. Feeling types prefer to make decisions primarily by how they affect people, and they may prefer to overlook prescription and proscription when injustices may result from their application.

Judging/Perceiving generally refers to an individual's relative desire for closure. Judging types prefer closure while Perceiving types prefer to "keep things open ended" in preference to future possibilities. Conflicts may arise when a Perceiver does not respect a Judger's desire to meet deadlines or a Judger does not respect a Perceivers desire for "one last improvement."

The above is only the briefest summary of conflicts that can be recognized and addressed via personality based analysis of natural language. There are deeper aspects of personality typing that can be applied to more complex problem domains.

As mentioned earlier, there are introverted and extroverted functions; for example, extroverted Thinkers tend be action oriented, whereas introverted thinkers tend to be more reflective. Extroverted Feelers tend to be more demonstrative of their affect, whereas introverted feelers tend not to express even their most strongly felt affect. For brevity the other more complex functions are not discussed here. The functions are further classified as dominant, auxiliary, tertiary and inferior, based on the order an individual prefers to use the functions and, resultantly, how adept they may be at actually using them.

Some Dominant Extroverted Sensors (who tend to be action-oriented daredevils) may cavalierly employ profanity in their communication, so such usage may not signify anything of particular importance. On the other hand, Inferior Extroverted Feelers rarely use such, but may do so when extremely stressed, so their usage of profanity should be notable to the recipient.

Organizations are also recognized as roughly having personalities. There are methods to calculate an approximate composite from the personalities of the individuals that comprise the organization, or a personality may be designated for the organization; one that it either aspires to or to which it wishes to conform. Organizations may wish to use such to enforce or encourage communication that conforms to the organization's ostensible personality.

Projects go through phases that may be termed personality driven. During the initial investigatory stages, Perceiving type communication that is exploratory and unstructured in nature may be encouraged. On the other hand, as a project nears general availability or is in maintenance mode, Judging or closure oriented communication with strictly sequenced actionable items with clearly defined delivery dates are enforced.

In many electronic communication systems, it would be beneficial for the source of a communication to have the assistance of a personality classification system in crafting the communication. Such assistance could, inter alia, reduce the conflict inherent in human communication and improve its clarity and effectiveness by making use of the personalities of the individuals involved, the chosen (or effective) personality of an organization, or the stage of a particular endeavor or project.

SUMMARY OF THE INVENTION

These and other needs are addressed by the various embodiments and configurations of the present invention. The invention is generally directed to behavioral identification and analysis involving multiple grammars defining behavior.

In one embodiment of the invention, a method includes the steps:

(a) receiving a behavior-descriptive input stream;

(b) lexically analyzing the behavior-descriptive input stream to provide a tokenized equivalent;

(c) syntactically parsing the tokenized equivalent to provide a parser output;

(d) semantically analyzing the parser output to provide an indication of at least one of a behavior and type of behavior described by the input stream; and (e) based on the indication, selecting an appropriate response.

Although the embodiment can apply to human and nonhuman behavior, it is particularly applicable to human behavior as characterized or influenced by natural language. A multitude of factors influence human selection of words, phrases, and sentences. In many applications, selected factors can be ascertained by analysis of natural language selection.

The embodiment can be particularly useful in mediating interpersonal communications between parties having differing personality classifications, types, and/or functions. By using the personalities of the individuals involved, the chosen (or effective) personality of an organization, or the stage of a particular endeavor or project, computer-enabled mediation can not only impact positively the clarity of communications but also reduce the conflict inherent in human communication and improve its clarity and effectiveness.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "behavior" refers to the manner in which an entity, whether human or nonhuman, behaves, acts, or functions. Behavior is not limited to physical conduct but includes passive activities, such as thoughts, perceptions, beliefs, and traits or characteristics that influence how the entity behaves, acts, and/or functions.

The term "computer-readable medium" refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, are used interchangeably and include any type of methodology, process, mathematical operation or technique.

A "formal grammar" or "grammar" refers to a precise description of a formal language, e.g., a set of strings in some alphabet. Two primary categories of formal grammar are generative grammars, which are sets of rules for how strings in a language can be generated, and analytic grammars, which are sets of rules for how a string can be analyzed to determine whether it is a member of the language. A typical grammar includes four components, namely a set of tokens or terminal symbols, a set of non-terminal symbols, a non-terminal symbol designated as a start symbol, and a set of production rules.

The phrase "lexical analysis" refers to the process of converting a sequence of characters into a sequence of tokens. Modules performing lexical analysis are referred to as lexical analyzers or lexers. A lexer normally includes a scanner, which is usually based on a finite state machine that identifies indivisible characters, known as lexemes in a string of input characters and a tokenizer, which demarcates and commonly classifies, as tokens, sections of the string.

The term "module" refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "parsing" refers to the process of analyzing a sequence of tokens to determine its grammatical structure with respect to a given formal grammar.

A "regular expression" refers to a string that is used to describe or match a set of strings, according to certain syntax rules.

The term "semantics" refers to aspects of meaning, as expressed in language or other some other system of signs or symbols.

The term "syntax" refers to the structure of sign systems. Unlike semantics, syntax focuses on form, not meaning.

The term "token" refers to a categorized block of text, usually consisting of lexemes. "Tokenization" refers to the assignment of meaning to lexemes.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The General Architecture

Figure 1:
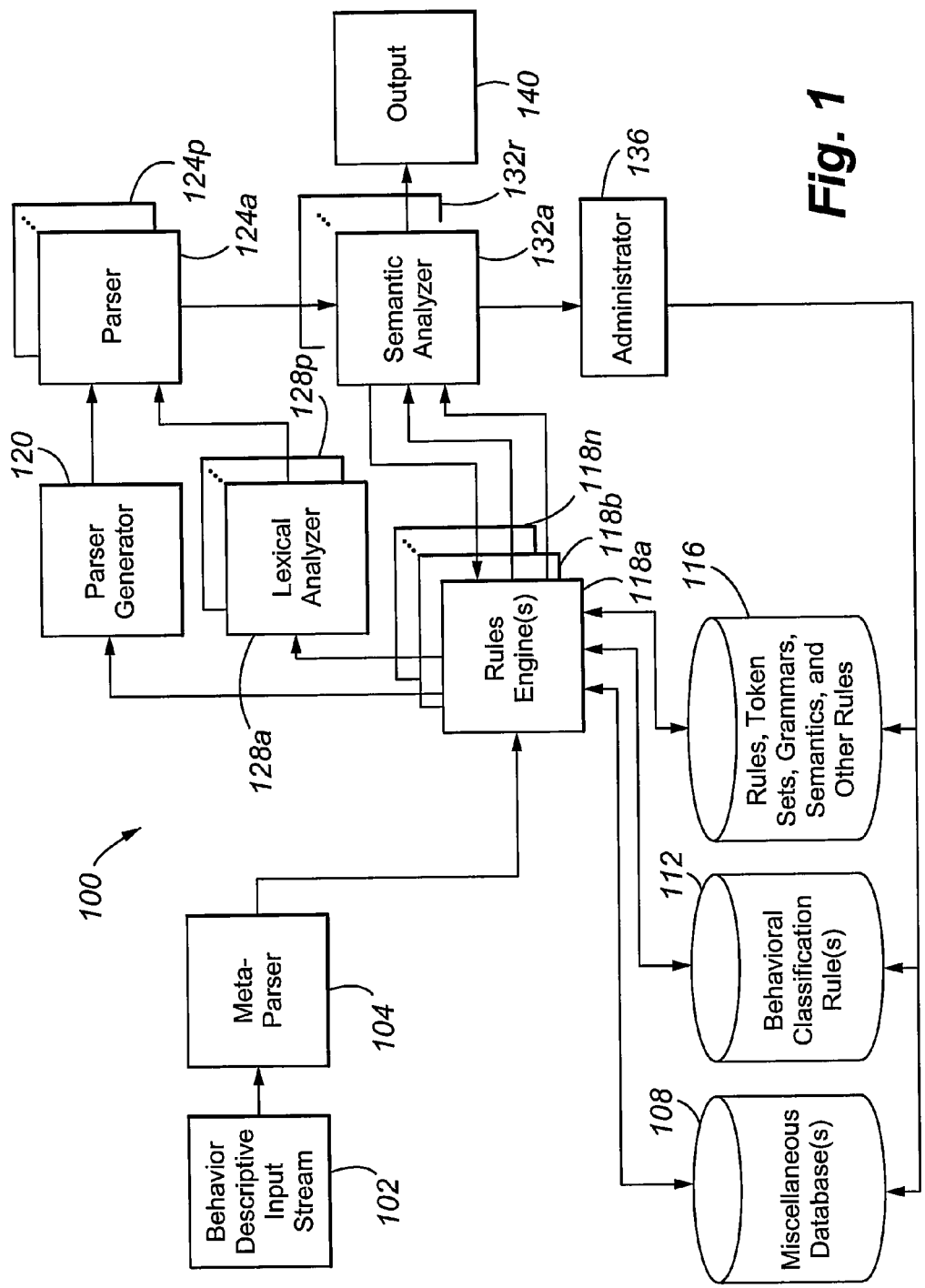
FIG. 1 is a block diagram depicting a behavioral identification and analysis system according to an embodiment of the present invention.

FIG. 1 shows a behavior identification and analysis system according to an embodiment of the present invention. The system 100 includes, for processing a behavior-descriptive input stream 102, a meta-parser 104, various databases 108, 112, and 116, a rules engine 118*a-n*, a parser generator 120, a plurality of parsers 124*a-p*, a plurality of lexical analyzers 128*a-p*, a semantic analyzer 132*a-r*, and an administrator 136, which collectively form output 140.

The system 100 can identify a broad range of behavior. By way of example, the system 100 can receive arbitrary artificial language strings generated by computational components, analyze the strings, and identify behavior patterns associated with the strings. The behavior patterns, for instance, can be related to malfunctioning or alarming of computational components. In another example, the system 100 can receive a communication, including natural language strings, generated by a human sender for a human recipient, analyze the strings, optionally identify a behavior or type of behavior, such as a trait or characteristic (e.g., personality classification or type, culture, role, organizational position, etc.) of the sender, and/or, based on prior knowledge of a trait or characteristic of the recipient, optionally suggest alternative natural language for the communication.

The input stream 102 can include context or be context free, be from any source, and include strings of characters indicative of types of behavior by a source and/or recipient. The behavior can be associated with a natural and/or artificial entity, such as a person, a machine, a computer, and the like. The characters in the input stream 102 commonly are part of an artificial or natural language intended for communication but, in one configuration, are contextually-descriptive. Examples of language-type characters include letters, words, phrases, and sentences of natural languages and characters in machine languages. Examples of contextually descriptive characters include descriptions of a physical action, physical trait or characteristic, logical trait or characteristic, logical location, spatial or geographical location, identity, role, ethnicity, nationality, and combinations thereof. Examples of physical action-descriptive characters include descriptors of facial expressions, speech characteristics (e.g., inflection, the existence and duration of pauses between words, voice spectral distribution, and the like), bodily movements (e.g., hand gestures, arm movements, keystrokes on a key board, and the like), bodily functions (e.g., pupil dilation, pulse rate, breathing rate, and the like), and web browsing history. Examples of physical characteristic-descriptive characters include descriptors of physical appearance (e.g., height and weight, clothing type and color, facial features, and the like), bandwidth measure, processing or memory capacity, operational state, nonoperational state, Quality or Grade of Service, and the like. Examples of logical characteristic- or location-descriptive characters include network address (e.g., IP address, MAC address, Universal Resource Locator, and Domain Name System). Examples of spatial location-descriptive characters include Global Positioning System (GPS) coordinates, street address, country identifier, culture identifier, and the like. Examples of identity-descriptive characters include name, employee identification number, serial number, and the like. "Identity can be mapped to multiple addresses or other identifiers. For example, a subscriber can have multiple identities corresponding to multiple communication devices. However, a subscriber's identity may need to be qualified to filter out communications from other persons, such as a personal assistant of an executive sending communications using the executive's personal digital assistant or sending out communications using the assistant's device but under the executive's signature. Examples of role-descriptive characters include descriptors of organizational or family position.

Because it is often impractical to create an all-encompassing grammar to deal with all types of behavioral definitions, the meta-parser 104 is a higher-level object that receives the input stream 102, which can arbitrarily involve multiple grammars, and attempts to determine the structure to assist the rules engine(s) 118*a-n* in selecting an appropriate parser 124*a-p* or in requesting the parser generator 120 to create an appropriate parser 124*a-p*. To provide this assistance, the meta-parser commonly performs a preliminary parse of only selected portions of the input stream 102. Output from the meta-parser includes the input stream 102, an indicator of whether the meta-parser was able to successfully parse the input stream 102, and, if so, an appropriate grammar or set of grammars to be considered by the rules engine(s) 118*a-n* in controlling downstream processing by the lexical analyzer 128 and parser 124. In some applications, the meta-parser can provide preliminary indications to the rules engines 118*a-n* not only of what grammar is likely involved but also of what behavior classification system category or type may be involved. The meta-parser and its operation is further described in copending U.S. patent application Ser. No. 10/728,730, filed Dec. 4, 2003 entitled A Dynamic System of Autonomous Parsers for Interpreting Arbitrary Telecommunication Equipment Streams, which is incorporated fully herein by this reference.

The miscellaneous database(s) 108 typically include data associated with the source and/or intended recipient of the input stream 102. In a system 100 designed for assisting in interpersonal communications, for example, the databases 108 include electronic (e.g., Microsoft Outlook™) calendars for enterprise network subscribers, personal profiles of network subscribers and non-subscribers interacting with the subscribers, subscriber user interface types and configurations, and collections of prior correspondence involving selected subscribers and/or non-subscribers. Personal profiles include names or other identifiers associated with each subscriber and non-subscriber and, associated therewith, information such as communication device addresses and capabilities, presence and availability information, personality type, classification, or function culture type, geographical location, organizational position or role, native language and languages of fluency, state of health, and interests/hobbies.

The database 112 includes behavioral classification rule(s) to be applied by the rules engines 118*a-n*. These rules are expressions or definitions of behavioral classification systems to be applied by the system 100. By way of example, in a system 100 facilitating interpersonal communications, the behavioral classification systems are different personality classification systems, such as Meyers-Briggs, Keirsay-Bates (*Please Understand Me*), Keirsay (*Portraits of Temperament*), Eilers and Carabello (*Full Spectrum Leadership*) and DeBono (6 *Thinking Hats*). In another example, the behavioral classification systems define differing types of behavior by computational components, such as types of malfunctions and indicators thereof.

The database 116 includes, for each behavior classification system in the database 112, token sets, grammars, semantics, and other rules. Each behavioral classification system can have one or more associated grammars. Each grammar is associated with one or more token sets, semantic rules, and other rules. For example, computational components generally have certain common normal and non-normal behaviors. Each type of behavior can be expressed in differing grammars or differing artificial (or synthetic) languages. In another example, each personality classification system has differing ways of associating personality types with behavior. These ways typically involve associating instances of words, phrases, and sentences with specific personality types. In Myers-Briggs, for instance, the personality types are analyzed along eight dimensions, and one's personality type is a combination of four letters. These dimensions include Introversion ("I"), Extroversion ("E"), Sensing ("S"), Intuition ("I"), Thinking ("T"), Feeling ("F"), Judging ("J"), and Perceiving ("P"). Four of the dimensions (S/N and T/F) are called functions. There are sixteen types, which reflect all possible combinations of the eight dimensions in their pairs. Examples of types include "ESTJ" which refers to a person having the predominant or preferential dimensions of Extroversion, Sensing, Thinking, and Judging and an "INTP" to a person having the predominant or preferential dimensions of Introversion, Intuition, Thinking, and Perceiving.

Each type-specific norm has certain strong descriptive attributes. For example, the strong descriptive attributes of introversion include quiet and contained; extroversion include gregarious and auditory; sensing include concrete, realistic, critical, tough, and logical; intuition include abstract, imaginative, original, and intellectual; thinking include tough, logical, questioning, and reasonable; feeling include accepting, affective, and compassionate; judging include stress avoider and scheduled; and perceiving include emergent, poly-active, spontaneous, and casual.

A person's personality type is evidenced by his or her reaction to external and internal stimuli and is frequently discernible not only by his or her physical behavior but also by his or her selection of specific language to convey a thought or concept For instance, an introvert uses words such as "I", "me", and "alone", an extrovert such as "we" or "us", a senser uses words such as "plan", "schedule", "cost effective" and "common sense", an intuitive person words such as "imagine" and "theory", a thinker words such as "think" and "argue", a feeler words such as "feel" and "tolerate", a judger words such as "never" and "always", and a perceiver words such as "see".

Tokens are used to identify individual words and sets of words and/or actions indicating a dimension or personality type, for example. Syntactical rules can define the form or structure of the tokenized stream, while semantic rules define the meaning of the structure or the personality type or dimension statistically likely to be involved. A personality classification system may correspond to one or multiple grammars, depending on the application.

Rules engine(s) are described further below.

The lexical analyzer 128*a-p* applies token sets to the input stream 102 to output sequences of tokens or a tokenized stream. In a typical lexical analyzer, a scanner, or finite state machine, identifies possible sequences of characters contained within an applicable token set, and a tokenizer demarcates and, possibly, classifies sections of a string of input characters. The output from the lexical analyzer 128*a-p* may include only the tokenized equivalent or optionally also the original input stream 102.

The parser generator 120 generates, from a formal grammar, a parser 124*a-p* suitable for parsing a tokenized output stream. The parser generator 120 associates executable code, or semantic action routines, with each of the rules of the grammar to be applied. The semantic action routines define the semantics of the syntactic structure to be analyzed by the parser. Depending on the type of parser to be generated, the semantic action routines can construct a parse tree or generate executable code directly. Commonly, a parser generator creates a parser by mapping a Backus-Naur form definition to a parser to implement the grammar.

The parser 124*a-p* applies syntactical rules to the tokenized output stream of the lexical analyzer 128*a-p* to provide a structured output. The structured output can be of any form, the most typical of which is a data structure, particularly a tree (e.g., a parse tree and abstract syntax tree), which captures the implied hierarchy of the tokenized output stream of the analyzer 128*a-p*. The lexical analyzer 128 and parser 124, can, depending on the application, be configured to process a context-sensitive or context-free input stream 102. The parser 124 can perform top-down or bottom-up parsing and generate a leftmost or rightmost derivation. When the input stream 102 contains context, the parser 124 can be any suitable parser suitable for ambiguous grammars, such as a chart parser. Commonly, a unique pairing will exist between a lexical analyzer 128*a-p* and a parser 124*a-p*. The original input stream 102 is passed through to the parser 124 and semantic analyzer 132, particularly when the steam 102 includes embedded contextual information.

The rules engine(s) 118*a-n* can perform a variety of operations. The rules engine(s) 118*a-n* provide token sets to lexical analyzers 128*a-p* to be used to process segments of an input stream; invoke a particular parser 124*a-p* to handle input stream segments; invoke creation of a parser by the parser generator 120 and provide the syntactical rules to be used in parser creation; provide alternate semantic grammars to the semantic analyzer 132*a-r*; create grammars dynamically according to predetermined rules sets and provide token sets to the lexical analyzer 128*a-p* and/or syntactical rules to the parser generator 120 to create an appropriate parser 124*a-p* to process an input stream defined by the newly created grammar; and receive, from the semantic analyzer, feedback on errors in or updates to semantics rules or definitions.

The semantic analyzer 132*a-r*, applying semantic rules received from the rules engine(s) 118*a-n*, imputes behavior, such as a personality type or classification, to the output of the parser 124*a-p*. The rules engine(s) 118*a-n* can create specific semantic analyzers 132*a-r* to handle specific grammars or sets of grammars. Semantics can be defined, and new semantic analyzers created, using any suitable methodology, including operational semantics, denotational semantics, and axiomatic semantics. Commonly, an axiomatic definition of a grammar is first constructed to define an input language and how it realizes desired properties, a denotational semantics is constructed second to provide meaning to the language, and a formal proof is constructed third to demonstrate that the semantics contain the properties specified by the axiomatic definition. As will be appreciated, the denotational definition is a model of the axiomatic system. Finally, the denotational definition is implemented using an operational definition.

The administrator 136 can be a computational module and/or a human that updates the various databases 108, 112, and 116 with additional information discovered or identified by the semantic analyzer 132. For example, the analyzer 132 can identify specific behaviors associated with the processed input stream 102 and provide those behaviors to the administrator 136, which then updates data structures to reflect those behaviors. The receiving module would then reconfigure or update the rules or definitions.

The output 140 can take many forms and generally provides an indication of behavior or type of behavior associated with a selected segment of the input stream 102. For example, the output 140 can impute behavior or types of behavior to an abstract syntax tree output by a parser 124*a-p*.

In one configuration, the output 140 is used to generate recommendations or commands responsive to an alarm stream received from a malfunctioning component.

In another configuration, the output 140 is used to drive avatar behavior. For example, the perceived behavior determined by the system 100 is used to render similar or opposite behavior in the avatar.

The Personality Type or Classification Architecture

A specific application of the system of FIG. 1 is in identifying personality types or classifications and assisting or mediating interpersonal communications. This application can alleviate communication conflicts among users by using a computer program to analyze both the form and content of natural language created by an author. The Myers-Briggs test, for example, contains word preference choices that can be used by the parser 124. The analysis is used to shape their responses. Their responses are shaped by personality-based goals that guide and prompt them. The guiding and prompting component can be relatively straight forward and might be, but is not necessarily restricted to, predefined pop-ups and outlines to be filled in. As discussed below, and, when desired, automatic analysis of message content may result in dynamically selected and configured pop-ups and outlines proffered to authors.

In one example, a canned pop-up guide is generated when an introvert begins to respond to an email from an extrovert. When the two are conveniently geographically collocated and with clear schedules, the pop-up might suggest that the introvert just drop-by the extrovert's office to discuss the response in person. If the two are not conveniently collocated, the pop-up might suggest a phone call instead. Conversely, when an extrovert requests an appointment with an introvert, the extrovert might be prompted to schedule the appointment in the morning when introverts tend to be most alert, because a day of interaction with others tends to tire them more quickly than more extroverted types.

Figure 2:
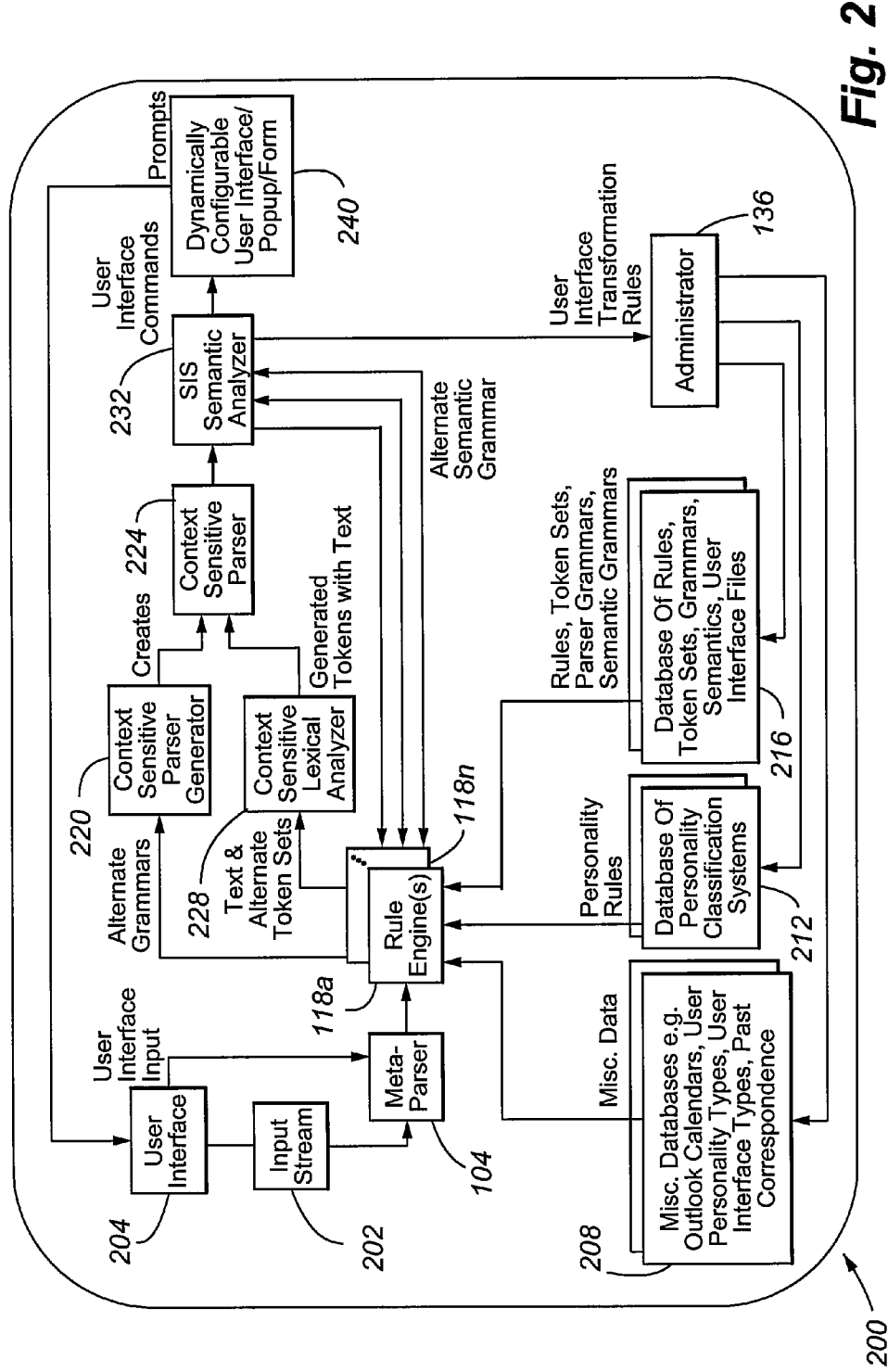
FIG. 2 is a block diagram depicting a personality classification identification and analysis system according to an embodiment of the present invention.

This system will now be discussed in more detail with reference to FIG. 2.

The system 200 for processing input stream 202 includes a user interface 204 for bidirectional communications with a user, a meta-parser 104, rules engines 118*a-n*, miscellaneous database 208, a database 212 of personality classification systems, a database 216 of rules, token sets, grammars, semantic definitions, and user interface rules, a context sensitive lexical analyzer 228, context sensitive parser generator 220, context sensitive parser 224, sematic analyzer 232, administrator 136, and output 240.

The input stream 202 can be in the form of text, audio, and/or video and includes natural language interpersonal communications from the user/subscriber (not shown) to be provided to an intended recipient (not shown) (who may be a subscriber or nonsubscriber) or interpersonal communications from a third party (subscriber or nonsubscriber) to the user. The input stream 202 commonly includes not only the communication but also contextual tags and identifiers of the source and recipient. As noted above, the contextual tags, for example, can describe physical location of the source and/or recipient, voice spectral distribution, timing information respecting the provision of selected parts of the communication by the source (e.g., keystroke delays, pauses between words or sentences, etc.), body part gestures or movements, physical appearance (e.g., clothing worn by the source, hair style and color, and the like), and biometrics information.

The meta-parser 104, rules engines 118*a-n*, and administrator 136 are discussed above.

The lexical analyzer 228, parser generator 220, parser 224, and semantic analyzer 232 are as discussed above with reference to their counterparts in the system 100, except that they are context sensitive. Context sensitive components can cope with ambiguity inherent in natural language. An example of an ambiguous word is "cleave", which can mean "to adhere or split". To determine the word's correct meaning, the text must be searched an arbitrary distance from the word cleave for the occurrence of knife, axe, etc. or man and women to heuristically determine its meaning to be split or adhere, respectively.

Like a compiler, these components provide the framework needed for recognizing lexical and syntactic content. However, unlike standard compilers for artificial formal languages such as C++, this system is extraordinarily flexible to cope with the variety of ways that natural language needs to be parsed to recognize the various contexts of key words and the structures in which they may be embedded Such flexibility can recognize not only patterns of key words associated with personality but also the occurrence of higher level structures, such as lists of items, that tend to be used by the more Judging types. The repeated use of lists may classify the author, for future reference, as a Judging type.

Parser generators, such as JavaCC, have the native ability to use context sensitive analysis to change the kinds of tokens (including marker tokens that are aggregations of tokens that can be used to simplify abstract syntax trees) found during lexical analysis and also change the abstract syntax trees created by, perhaps, common tokens. Abstract syntax trees represent the author's text in a form that allows semantic analysis to generate behavior, in this case, dynamically configured pop-ups, outlines, or forms that are presented to an author or recipient.

The incorporation of rule-based syntactic analysis makes it easier to encode novel heuristics not typically possible with formal language compilers.

The database 208 is as discussed above with reference to database 108 except that it includes scheduling or electronic calendar information, notes, personality types associated with particular persons (whether or not subscribers), user interface types supported and configurations thereof, and collections of historical correspondence involving one or more persons, such as Microsoft Outlook™ Journal entries.

The database 212 is as discussed above with reference to database 112 and specifically includes definitions of differing personality classification systems.

The database 216 is as discussed above with reference to database 116 and includes rules, token sets, grammars, and semantics associated with specific personality classification systems and user interface rules. User interface rules, for example, stipulate what information is to be provided to the user via user interface 204 in response to specific output from the semantic analyzer. These rules cause the generation of output 240, which commonly provides dynamically configurable user interface pop-ups and forms containing suggestions or recommendations for changes to the input stream 202 or requests for additional information to be used in further processing the input stream 202. When the semantic analyzer 232 analyzes the output of the context sensitive parser 224, it forwards the results to the rules engines 118a-n, which map the results to the user interface rules and provide appropriate output 240 (or user interface transformation rules) to the analyzer 232 to provide to the user interface 204.

The system 200 can use natural language word selections and contextual tags to identify a likely personality type associated with the author and/or, knowing a personality type associated with an intended recipient, propose recommendations or suggestions to the author for more effective ways to communicate the intended meaning to the recipient. By way of example, a first person provides a text message to be sent to a second person. The system analyzes the message and, applying knowledge of the personality type of the second person, suggests, via the user interface 204, to the first person changes to the message text using words, phrases, or sentences corresponding to the second person's personality type.

The suggestions are not limited to word selection or sentence organization but can include general suggestions on how to organize the message or descriptions of the personality type of the second person. For example, a recipient receives a text message that is processed by the system. To assist the recipient in understanding the intended meaning of the message, the recipient could be presented with an explanation of the sender's personality type and preferential behavior. The description of the second person's personality type could include, for instance, generalized preferences and/or non-preferences of that personality type respecting items such as in the type, channel, or modality of communications or composition of communications. By way of illustration, certain personality types disfavor details and others disfavor voice communications over text communications.

The system 200 can use personality types entered by a user and/or determine a personality type of an individual by processing a sampling of historic or contemporaneous communications from that individual. This can be done, for example, by analyzing email and voice communications from that individual. The voice communication analyses can be performed based on recorded voice communications, such as voice messages, and/or real-time communications, such as during a multi-party telephone call. Voice communications are preferably converted to a textual representation prior to such analysis.

Because workplace privacy concerns may be triggered, the system 200 may be applied to analyze communications of a party who has previously consented to such analysis. A flag may be included in the personality file of the person indicating that he or she has or has not consented to such analysis. If he or she has not consented and he or she is an employee of the business, a privacy filter (not shown) would prevent communications from that person from being inputted into the system.

When further information is requested from a user and responsive information is received from the user, the user interface 204 forwards the information to the meta-parser 104. The meta-parser 104 forwards the information, typically without further analysis, to the rules engine 118. The rules engine 118 can then provide the additional information to the semantics analyzer 232 for use in processing a selected portion of the input stream 202.

When a user changes a communication in response to user interface communications received from the semantic analyzer 232, he or she can elect to send the communication to the user and bypass further analysis by the system 200 or submit the revised communication to the system 200 for further analysis. The user can provide a selected communication to the system 200 as many times as he or she desires until the requisite level of comfort is obtained by the user.

This system can be employed in any setting where interpersonal communications occur, including in an inbound or outbound call center, a business (such as inter-employee communications and sales and service communications with customers and potential customers), a dating service, gaming, conflict resolution, job matching, and the like.

The following describes some of the interactions among personality types, personality-based syntax searched for, and semantic behavior to be expressed for the detected syntax, but is not limited to these.

Interactions are between individuals with different major functions, from specific types, to specific types, and selling (ideas too) to individuals with specific combinations of functions.

Interactions from an Individual (or Group) to Another with a Different Major Function When the mail is between groups rather than individuals, the major function can be derived by averaging the scores of the involved individuals.

From E to I—Is tend to have higher energy levels in the morning. After a day of interacting with others, they tend be tired out by it. When an Outlook™ appointment or meeting is scheduled, or the text indicates that some sort of attempt at a meeting is requested, the E is prompted to try to arrange early morning meeting, if possible.

From I to E—Es tend to prefer personal interactions to email or voice mail. When an Outlook™ appointment or meeting is scheduled, or the text indicates that some sort of attempt at a meeting is requested, the I is prompted to call or visit the E in person. Also, extroverted organizations tend to be exceptionally collaborative, so Is should be encouraged to contact and re-contact such through a "tickle file" like operation.

From S to N—Ns tend to need an overview or big picture and Ss prefer linear detail that unfortunately may not have an organizing principle. When the text contains many lists, the S is prompted to be sure to include some sort of summarizing ideal. The N may need regular reminders of details they may prefer to ignore. A check list may be maintained to ensure that they are addressed.

From N to S—Per above, if there is a lot of prose, but a dearth of lists, the N is prompted to be sure to include lists whose items can be linearly connected, i.e., avoiding intuitive leaps with unsupported connections.

From T to F—Ts tend to be formal and overlook the niceties of social lubrication whereas Fs value it. The T is prompted to include such when it is missing. Some prompts may include friendly salutation or closing, or recall past meeting. The semantics can aid the T by using ELIZA-like tactics by searching past correspondence for references to hobbies, family, awards, etc.

From F to T—per the above, Fs should try to avoid words with an emotional or personal interpretation and those are highlighted to aid in removing them. They are reminded to be business-like and clear about objectives and avoid chit-chat, even work related. They should emphasize rules and objectives.

From J to P—Js tend to be oriented toward closure and Ps towards open-ended behaviors. When the Js text seems to contain many requested or demanded actions, they are prompted to narrow the number of actions or focus what one thing to do now.

From P to J—per the above, when the Ps text seems to offer to provide many actions, they will be prompted to narrow them to a smaller number that they can do immediately or soon.

Warnings to a Recipient that an Individual (or Group) is Stressed.

From INTP/ISTP/ESTJ/ENTJ—any text containing profanity indicates the highest stress states and a suitable warning is given to the recipient that this is likely unusual behavior for these types.

From INTP—this is one of the more reserved types. If text originating from this type is written in other than the passive voice, it would tend to indicate a state of stress and warnings similar to that immediately above is provided. Passive voice is detected by grammar checks in MS Word and is prior art.

From ISFP/INFP—these types tend to be most observant of others sensibilities and any criticism, critical voice, or accusatory text indicates the highest stress state for these types.

From ESFJ/ENFJ—these types tend to be stressed when they use convoluted logic or are excessively critical.

From ESTP/ESFP—these types tend be stressed when they use confused or prolix speech. This can be measured using techniques that measure the grade level of text.

From INTJ/INFJ/ISTD/ISFJ—stress is indicated when there is an obsessive level of details and data or if a long reply is sent very soon after a stimulus.

From ENTP/ENFP—text complaining of bodily complaints indicates stress or a lack of response to previous communications. Additionally semantics would be to track the timeliness of responses and warn the user when there is a lack of response from these types.

From ESTP—blunt text or profanity from these types is not particularly unusual, and the recipient would be so notified.

General Prompts for Text Originated to Specific Types.

To ENFJ—warn originator to avoid personal criticism, and be aware that this type has, as a weakness, a tendency to sweep problems under the rug.

To INFJ—create a tickle file of reasons to contact these types because they have a tendency to keep to themselves, but the originator should be on the look out for useful talents for collaboration because they are usually underestimated. The semantics can prompt the originator to log such talents.

To INTJ—create a tickle file of reasons to contact these types. They tend to appear unapproachable, and can be, and require persistence.

To INFP—this type tends toward perfectionism, a tickle file should give them time for reflection.

To INTP—this type needs help drawing back from theoretic and moving toward the concrete.

To ISFJ—keep in mind that these types tend towards pessimism and can be undervalued.

To ISFP—this type may be gullible, require especial gentility and need help with fuller context.

To ISTP—need to be prodded into action, perhaps through a tickle file, may tend to take short cuts, and often appear indecisive and undirected.

To ISTJ—this type can be very rigid and like to conform to standards. This must be kept in mind when trying to please them.

To ESFJ—this type has trouble seeing the big picture and especially prefers to avoid conflict.

To ESTJ—this type prefers closure and tends to make quick decision. There may be a need to slow them down. They also prefer the status quo and will resist change.

To ESFP—this type needs to allocate time to reflect and focus on a task instead of socializing and needs prompting and help to reach completion.

To ESTP—this type is quick acting, but tends towards improvisations that may be short sighted.

To ENFP—this type needs help avoiding procrastination (perhaps through regular messages). They need help with details they may overlook. Care must be taken to avoid giving them too much to do because they will accept being over extended.

To ENTP—don't allow this type to become overextended. They need to be focused on current realities and care must be taken that they avoid standard procedures.

To ENTJ—This type needs to be reminded of other people's needs and will usually overlook their own. They shouldn't be allowed to make decisions too quickly and need help with practicalities.

Useful Interaction when Trying to Sell Things or Ideas to Particular Temperaments To ST—point out specific features that are superior to others, but be brief.

To NF—help them fantasize about their ideal product or service and tell how you come close. Help them fulfill their dreams. Brainstorm with them, but be honest, and do not appear to be using a numerical outline or sequence of points.

To SF—offer to be their friend who will advise and support them as they decide. Assure them that this is a long-term collaboration or relationship. Let them check things out on their own. Offer to provide loyal service.

To NT—give them an overview and lots of options and what ifs; be prepared to be critiqued, and give them lots of data.

Useful Interactions when Corresponding to Certain Temperaments

To SJ—assure them there will be no surprises; keep presentation short and present facts not opinions or feelings.

To SP—be flexible & direct, give escape hatch; avoid boring them; assign short duration tasks, don't reopen concluded issues. These can be gathered from past communication. Avoid personal references.

To NT—avoid topics that could be construed as politics; avoid creating personal conflicts. Always offer to discuss things.

To NF—avoid too many details, communicate such in person, personalize, bring out of isolation, provide regular messages; be genuine and honest.

Useful Interaction when Originating Correspondence from Certain Temperaments

From NT —especially need to avoid being offensive.

Text to Groups

To extraverted organization—ask to collaborate on decisions.

To introverted organizations—use written communication. In stressful times, help them avoid "circling the wagons."

To S organization give them details, masses of data, only propose incremental changes, and be clear about targets and plans.

To N organizations—avoid details for big picture.

To T orgs—emphasize rules and exceptions, and be clear about objectives.

To F orgs—emphasize people aspect; be clear about values driving decisions.

To J orgs—encourage information gathering, help the organization avoid quickness to judgments; provide specific standards, work towards clear closure.

To P orgs (these tend to be marketing and sales organizations)—keep standards general, be tolerant, and help with decision making.

The Operation of the Personality Type or Classification Architecture

Figure 3:
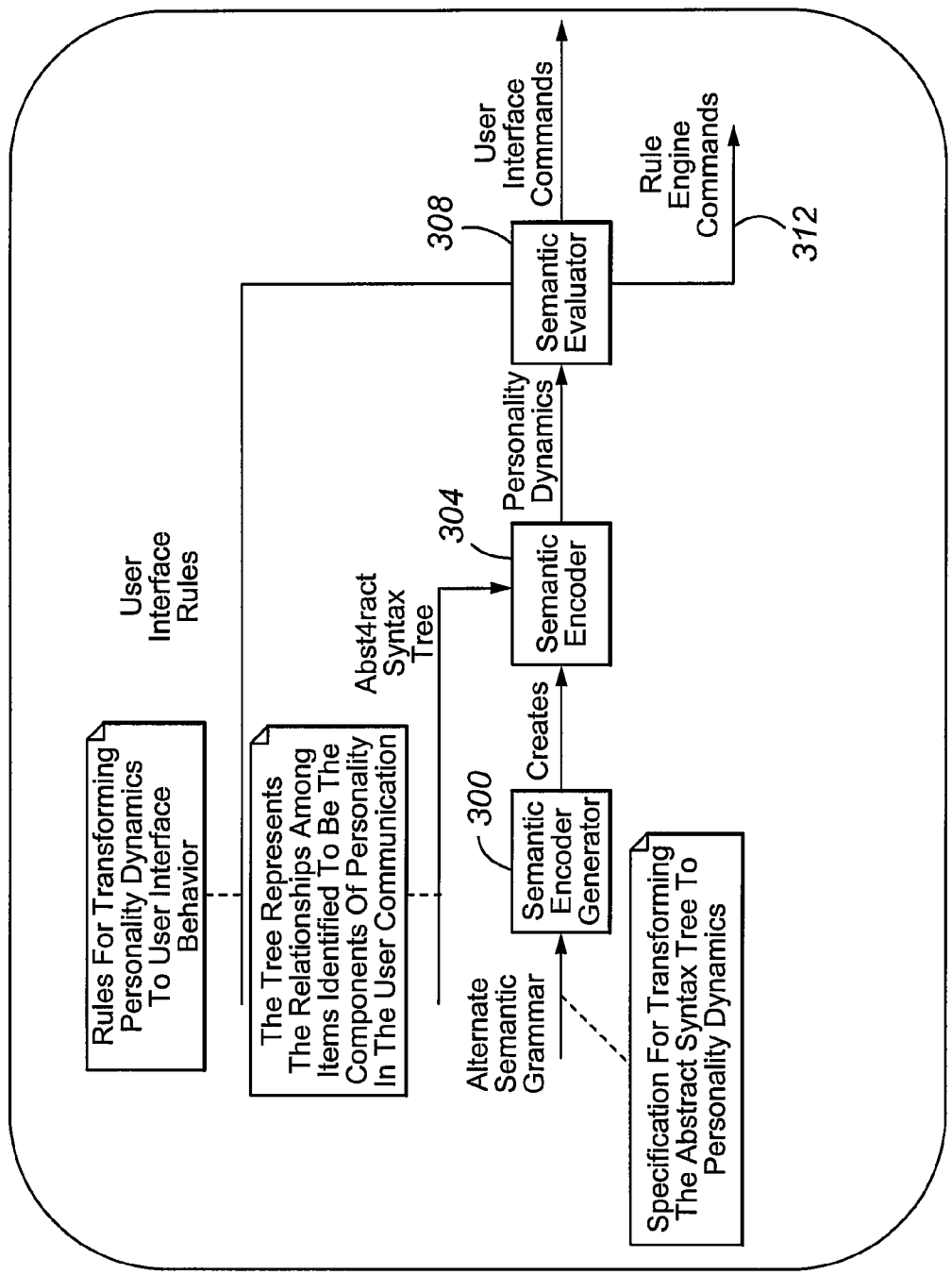
FIG. 3 is a static view of components of the system in one implementation.

An operational configuration of the system 200 will now be described with reference to FIG. 3. FIG. 3 is a static view of the semantic analyzer 232 and describes the generation of appropriate commands to the user interface 204. FIG. 3 assumes that the rules engine 118 has determined that an alternate semantic grammar is to be employed in analyzing a portion of the input stream 202. This determination can be done using user interface commands and appropriate feedback from the semantic analyzer 232, via feedback loop 312, with respect to the portion of the input stream 202.

A semantic encoder generator 300 in the semantic analyzer 232 receives, from the rules engine 118, a specification, or alternate semantic grammar, for transforming an abstract syntax tree output by the context sensitive parser 224 into personality dynamics. The semantic encoder generator 300, in response, creates a semantic encoder 304. The semantic encoder 304 is a component of the semantic analyzer 232. Creation of a semantic encoder 304 is further described in Schmidt, *Denotational Semantics—A Methodology for Language Development* 1986, which is incorporated herein by this reference.

The newly created semantic encoder 304 receives, from a context sensitive parser 224, and analyzes an abstract syntax tree associated with the portion of the input stream 202. The abstract syntax tree represents the relationships among items identified to be the components of personality in the portion of the input stream 202. The semantic encoder 304 outputs, for the abstract syntax tree, personality dynamics. "Personality dynamics" refers to aspects of behavior, such as, but not limited to, personality type, classification, or dimension. In one configuration, personality dynamics are Lambda expressions, which are LISP statements. As will be appreciated, LISP statements are typeless. The Lambda expressions define, for example, the kinds of behaviors characteristic of a selected personality type.

The personality dynamics are provided to the semantic evaluator 308, which is also part of the semantic analyzer 232. The semantic evaluator 308 applies user interface transformation rules, which describe the operation and/or function of the user interface 204, to the personality dynamics to determine appropriate user interface commands 240 to provide to the user interface 204. Typically, the user interface transformation rules are received from the rules engine 118 and are Lambda expressions. In effect, the personality dynamics are a behavioral description of personality and the user transformation rules a behavioral description of a user interface, and the two sets of functions are combined to provide a further function.

As can be seen from the above, the semantic analyzer 232 receives Abstract Syntax Trees, whose nodes are natural language text converted to personality semantics that denote a particular personality behavior, e.g., extroverted thinking. The nodes are then transformed to User Interface ("UI") behavior, such as pop-ups and dynamically generated displays. The transformation is made under the direction of Abstract Personality Semantics generated from an even more abstract transformation. The latter transformation is a transformation of a grammar via an even more general grammar, i.e., the grammar representation of a specific personality classification system, via the Denotation Semantic Grammar that abstracts common behaviors from each of the specific personality systems. The design is a modified version of Mosses's Semantics Implementation System (SIS) described in *Denotational Semantics*, p. 281. The addition is a feedback path to a rules engine that allows text to be reparsed and have its semantics reanalyzed. This can allow for layers or composition of semantic behavior and to redirect semantic analysis based on the discovered semantics.

As noted, denotational semantics is a formal description of meaning or the behavior of computer programs. (See the *Handbook of Theoretical Computer Science*, Vol. B., J. van Leeuwen, Managing Editor, Ch. 11, *Denotational Semantics*, Mosses.) (in this case not human behavior, rather, executable actions). In this instance, the denotational semantics are descriptive of the components, i.e., the basic functions (Introversion/Extroversion, etc.) common to personality driven behavior. Denotational semantics provides a well known dual and bidirectional role. A sufficiently abstract semantic grammar allows both the mapping of a personality classification system to the grammars and tokens needed to identify key words associated with personality and, much more powerfully, the converse.

Abstract syntax trees can be mapped to personality classification systems, thereby allowing classification systems to be identified that were not requested by the user. This means that the user may have requested Myers-Briggs analysis, but the abstract syntax tree was also recognized as one associated with another classification system such as the Full Spectrum Leadership system. That, in turn, could trigger a more detailed Full Spectrum Leadership analysis. Even more remarkably, abstract syntax trees could be aggregated into new personality classification systems that have not previously been envisioned.

The bidirectional capability of denotational semantics permits the system to be applied to convert one formal language to another, such as PERL to C and vice versa, or an abstract specification of behavior to multiple implementation languages or conversely to extract an abstract specification of the behavior of a program written in multiple languages to an abstract representation of their common behavior.

Figure 4:
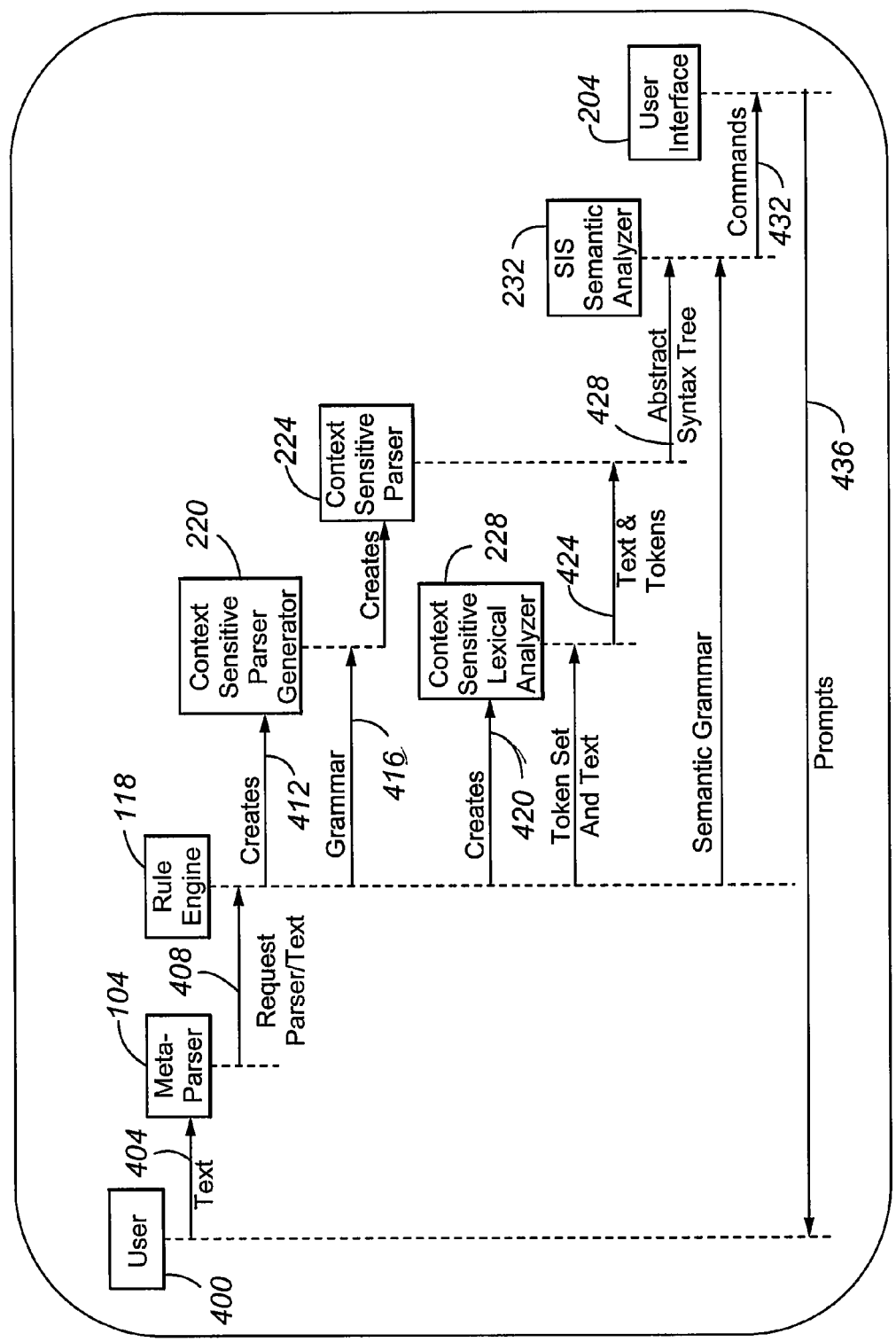
FIG. 4 is a top level sequence involving the system in one implementation.

FIG. 4 is a top level sequence showing a configuration of the overall process.

The user 400 provides text 404 to the meta-parser 104. The text can be alphabetical, numerical, or alphanumerical in content.

The meta-parser 104 provides to the rules engine 118 an output 408 that can include an indication of whether or not a selected portion of the text 404 was parsed successfully and, if so, which grammar or set of grammars best fit the parsed text.

The rules engine 118, in response, can perform multiple operations.

In a first set of operations, the rules engine commands 412 the context sensitive parser generator 220 to create a new context sensitive parser 224 and provides the generator 220 with a grammar 416 to be used in creating the new parser 224.

In a second set of operations, the rules engine 118 creates 420 a context sensitive lexical analyzer 228 using a token set.

In a third set of operations, the rules engine 118 provides the appropriate semantic grammar to the semantic analyzer 232.

In a fourth set of operations, the rules engine 118 provides a token set and text to the context sensitive lexical analyzer 228.

The lexical analyzer 228 applies the token set to the text 404 and outputs to the parser 224 the text and a tokenized text equivalent 424.

The parser 224 parses the tokenized text equivalent and outputs an abstract syntax tree 428.

The semantic grammar, abstract syntax tree 428 and, optionally, the text 404 are provided to the semantic analyzer 232, which applies the semantic grammar to the abstract syntax tree 428 and optionally text 404 to output commands 432 to the user interface 204.

Based upon the commands 432, the user interface 204 provides prompts 436 to the user 400.

In an exemplary scenario, the recipient's organization and/or project team composite personality type is known. After the text is entered, the author requests analysis, after which a pop-up provides hints as to the form and structure that is preferred by the recipient(s) based on the latter's personality type. More complex and involved types of messages may result in an outline to be filled in by the author. When there is a reasonable number of multiple recipients, and a message for a composite personality is not desired, then the sender would be guided appropriately for each individual personality type.

Alternatively, for the convenience of the sender and the standardization of their messages, an outline or form could be selected that conforms to their personality type.

If the personality type is not known, then a recorded personality type drawn from a historical analysis of the current recipient's previous communication to the current sender can be used.

Figure 5:
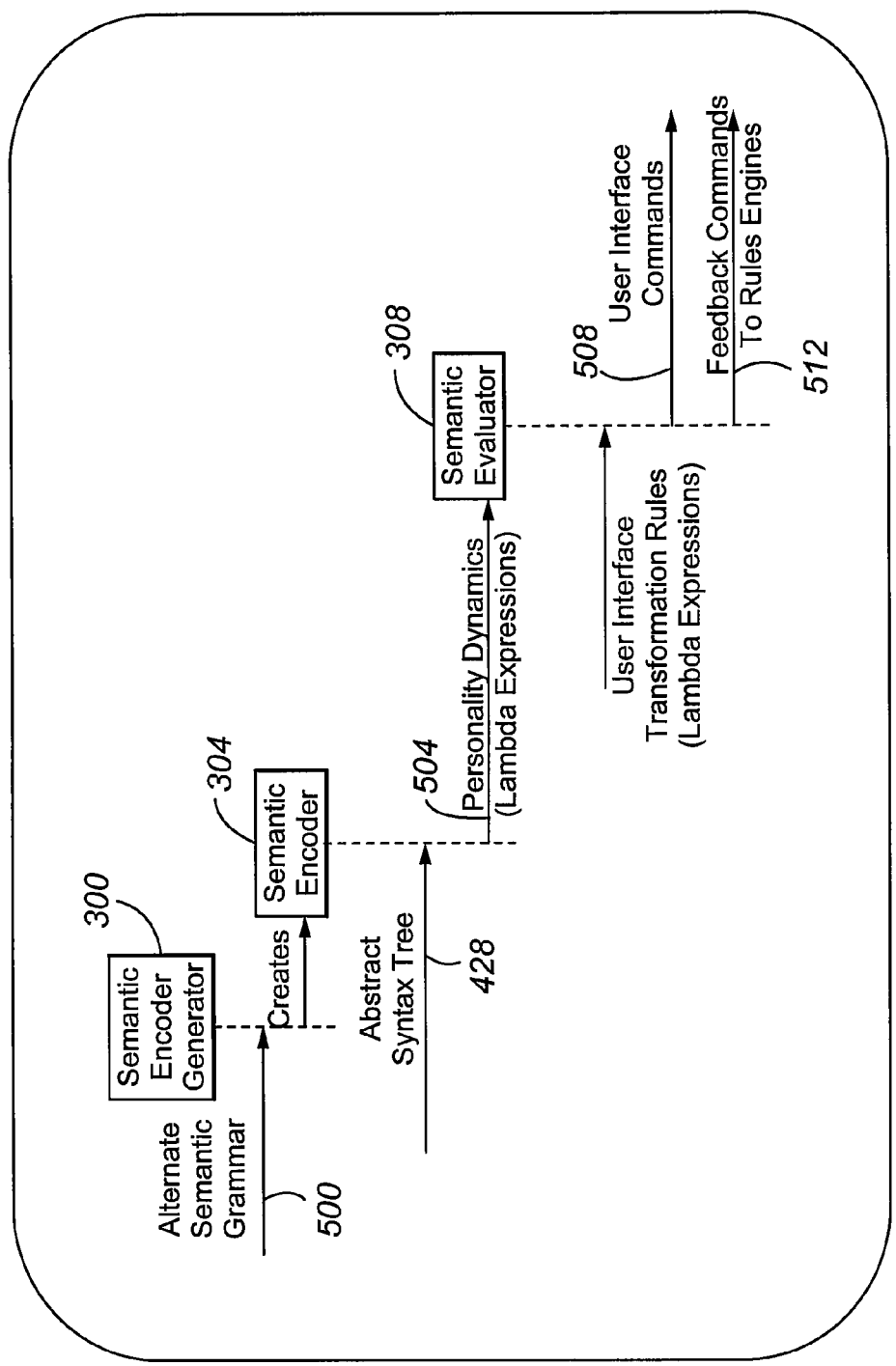
FIG. 5 depicts semantic analyzer behavior in one implementation.

FIG. 5 depicts behavior of the semantic analyzer of FIG. 3 in which an abstract syntax tree and user interface rules are transformed into user interface commands.

The rules engine 118 provides an alternate semantic grammar 500 to the semantic encoder generator 300.

The semantic encoder generator 300 creates a semantic encoder 304 based on the alternate semantic grammar 500.

The newly created semantic encoder 304 analyzes the abstract syntax tree 428 and outputs personality dynamics 504.

The personality dynamics 504 are provided by the semantic encoder 304 to the semantic evaluator 308 along with user interface transformation rules 508 provided by the rules engine 118.

The semantic evaluator 308, using the personality dynamics 504 and user interface transformation rules 508, outputs user interface commands 510 and/or feedback 512 to the rules engine over feedback loop 312.

Figure 6:
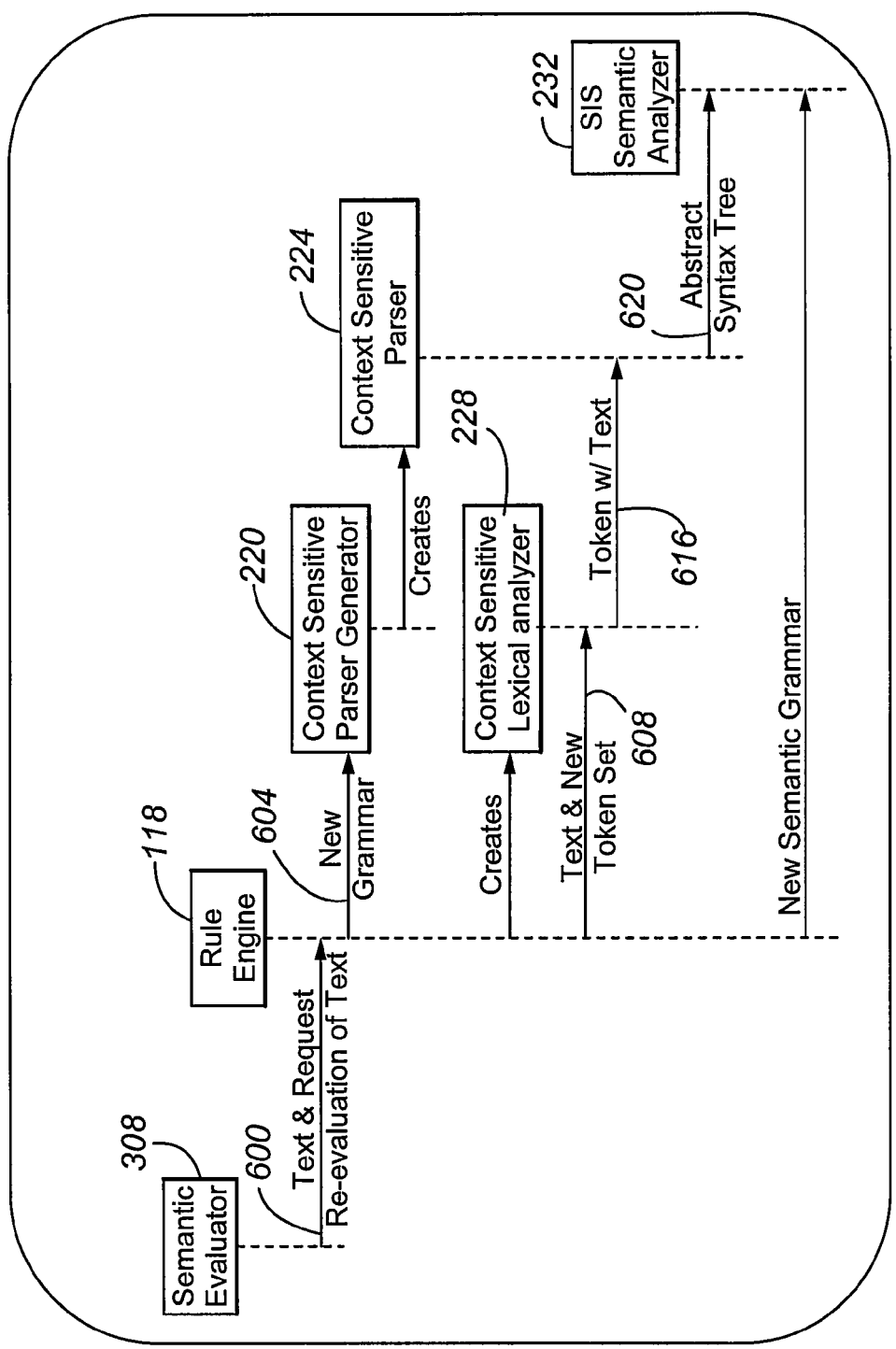
FIG. 6 depicts semantic evaluator requests in one implementation.

FIG. 6 depicts the semantic evaluator 308 requesting, via a command, re-evaluation of a selected portion 600 of the input stream 202.

The semantic evaluator 308 provides the selected portion of the input stream 202 and a request for re-evaluation of the portion 600 to a rules engine 118. The re-evaluation request can be generated in response to an unsatisfactory semantics analysis on the selected input stream portion.

In response, the rules engine 118 performs a number of operations.

In a first set of operations, the rules engine 118 provides a new grammar 604 to the context sensitive parser generator 220, which uses the new grammar 604 to create a context sensitive parser 224.

In a second set of operations, the rules engine 118 creates a context sensitive lexical analyzer 228 using a new token set 608.

In a third set of operations, the rules engine 118 provides a new semantic grammar 612 to the semantic analyzer 232.

The context sensitive lexical analyzer 228 provides the selected input stream portion and its tokenized equivalent 616 to the context sensitive parser 224.

Parser 224 outputs an abstract syntax tree 620 that is equivalent to the selected input stream portion.

The semantic analyzer 232 applies the new semantic grammar to the abstract syntax tree 620 to output appropriate user interface commands or further commands to the rule engine 118, as appropriate.

Exemplary systems and methods of this invention have been described in relation to an enterprise network. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as on a LAN and/or the Internet, or within a dedicated system. Thus, it should be appreciated, that the components of the system can be combined in to one or more devices, such as a PC, Personal Digital Assistant, laptop, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the behavior-descriptive information can include temporal information, such as times, durations, and frequencies of events and semantic relationships involving such information to aid in analysis and recommendations on how to respond to examples of human behavior. By way of illustration, the invention can act as a filter for ill-advised email bursts and flagging of replies to very old active-voice emails indicating embarrassment or frustration.

In another alternative embodiment, the systems and methods of this invention are implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) receiving a behavior-descriptive input stream;
   determining, by a meta-parser that performs a preliminary parse on one or more portions of the input stream, a structure of the input stream for either subsequent selection of a parser or subsequent creation of a parser, the meta-parser outputting the input stream and an indication of whether the meta-parser was able to successfully parse the input stream, the input stream output from the meta-parser being passed to the parser;
   (b) lexically analyzing the behavior-descriptive input stream to provide a tokenized equivalent;
   (c) syntactically parsing the tokenized equivalent to provide a parser output;
   (d) semantically analyzing, by a processor, the parser output to provide an indication of at least one of a behavior and type of behavior described by the input stream; and
   (e) based on the indication, selecting an appropriate response.

2. The method of claim 1, wherein the input stream comprises contextual information, wherein the contextual information comprises a plurality of a descriptor of a physical action, a physical trait, a physical characteristic, a logical trait, a logical characteristic, a logical location, a spatial location, an identity, and a role.

3. The method of claim 1, wherein the input stream is defined by a plurality of grammars and further comprising for a selected portion of the input stream:
   (f) determining a set of grammars potentially defining the input stream portion;
   (g) selecting a set of parsers, each parser set member being operable to parse according to at least one grammar set member; and
   (h) providing the input stream portion to at least one member of the set of parsers.

4. The method of claim 1, wherein the input stream is potentially defined by a plurality of grammars and further comprising:
   (f) determining that at least a portion of the input stream does not correspond to a known grammar;
   (g) in response, creating a grammar defining the at least a portion of the input stream;
   (h) performing at least one of the following sub-steps:
      (H1) creating a parser operable to apply syntactical rules associated with the grammar;
      (H2) creating a set of tokens associated with the created grammar; and
      (H3) creating a semantic encoder operable to apply semantical rules associated with the grammar.

5. The method of claim 1, wherein the at least one of a behavior and type of behavior is at least one of a personality classification, type, and function, wherein at least some of the tokens in the tokenized equivalent are associated with one or more natural language words, wherein the input stream is an interpersonal communication, and wherein the input stream is defined by a plurality of grammars, each grammar being associated with the at least one of a personality classification, type, and function.

6. The method of claim 5, wherein the appropriate response is at least one of:
   (i) providing to a recipient of the interpersonal communication a recommended response to the interpersonal communication, the recommended response reflecting at least one of a personality classification, type, and function determined to be associated with a source of the interpersonal communication;
   (ii) providing to the recipient a description of at least one of a personality classification, type, and function determined to be associated with the source of the interpersonal communication;
   (iii) providing to the source a recommended selection of words, phrases, and/or sentences to be used in the interpersonal communication, the recommendation reflecting at least one of a personality classification, type, and function determined to be associated with the recipient; and
   (iv) providing to the source a description of at least one of a personality classification, type, and function determined to be associated with the recipient of the interpersonal communication.

7. The method of claim 5, wherein, in step (d), at least one of a personality classification, type, and function associated with a source of the interpersonal communication is determined.

8. The method of claim 5, wherein step (d) outputs a personality dynamic associated with a source of the interpersonal communication and wherein step (e) comprises the substeps:
   (E1) selecting a set of user interface transformation rules;
   (E2) applying the personality dynamic to the set of user interface transformation rules to select a set of commands to provide to a user interface.

9. A non-transitory computer readable medium comprising processor executable instructions operable to perform the steps of claim 1.

10. A system, comprising:
    (a) an input operable to receive a behavior-descriptive input stream;
    determining, by a meta-parser that performs a preliminary parse on one or more portions of the input stream, a structure of the input stream for either subsequent selection of a parser or subsequent creation of a parser, the meta-parser outputting the input stream and an indication of whether the meta-parser was able to successfully parse the input stream, the input stream output from the meta-parser being passed to the parser;
    (b) a lexical analyzer operable to analyze the behavior-descriptive input stream to provide a tokenized equivalent;
    (c) the parser operable to syntactically parse the tokenized equivalent to provide a parser output;
    (d) a semantic encoder and processor operable to semantically analyze the parser output to provide an indication of at least one of a behavior and type of behavior described by the input stream; and
    (e) a semantic evaluator operable, based on the indication, to select an appropriate response.

11. The system of claim 10, wherein the input stream comprises contextual information, wherein the contextual information comprises a plurality of a descriptor of a physical action, a physical trait, a physical characteristic, a logical trait, a logical characteristic, a logical location, a spatial location, an identity, and a role.

12. The system of claim 10, wherein the input stream is defined by a plurality of grammars and further comprising:
- (f) a meta-parser operable, for a selected portion of the input stream, to determine a set of grammars potentially defining the input stream portion; and
- (g) a rules engine operable to select a set of parsers, each parser set member being operable to parse according to at least one grammar set member and provide the input stream portion to at least one member of the set of parsers.

13. The system of claim 10, wherein the input stream is potentially defined by a plurality of grammars and further comprising:
- (f) a rules engine operable to determine that at least a portion of the input stream does not correspond to a known grammar and, in response, create a grammar defining the at least a portion of the input stream; and
- (g) a parser generator operable to create a parser operable to apply syntactical rules associated with the grammar; and
- (h) a semantic encoder generator operable to create a semantic encoder operable to apply semantical rules associated with the grammar.

14. The system of claim 10, wherein the at least one of a behavior and type of behavior is at least one of a personality classification, type, and function, wherein at least some of the tokens in the tokenized equivalent are associated with one or more natural language words, wherein the input stream is an interpersonal communication, and wherein the input stream is defined by a plurality of grammars, each grammar being associated with the at least one of a personality classification, type, and function.

15. The system of claim 14, wherein the appropriate response is at least one of:
- (i) provide to a recipient of the interpersonal communication a recommended response to the interpersonal communication, the recommended response reflecting at least one of a personality classification, type, and function determined to be associated with a source of the interpersonal communication;
- (ii) provide to the recipient a description of at least one of a personality classification, type, and function determined to be associated with the source of the interpersonal communication;
- (iii) provide to the source a recommended selection of words, phrases, and/or sentences to be used in the interpersonal communication, the recommendation reflecting at least one of a personality classification, type, and function determined to be associated with the recipient; and
- (iv) provide to the source a description of at least one of a personality classification, type, and function determined to be associated with the recipient of the interpersonal communication.

16. The system of claim 14, wherein at least one of the semantic encoder and evaluator determines at least one of a personality classification, type, and function associated with a source of the interpersonal communication.

17. The system of claim 14, wherein the semantic encoder outputs a personality dynamic associated with a source of the interpersonal communication and the semantic evaluator applies the personality dynamic to a set of user interface transformation rules to select a set of commands to provide to a user interface.

18. A method, comprising:
- (a) receiving an input stream including an interpersonal communication;
- determining, by a meta-parser that performs a preliminary parse on one or more portions of the input stream, a structure of the input stream for either subsequent selection of a parser or subsequent creation of a parser, the meta-parser outputting the input stream and an indication of whether the meta-parser was able to successfully parse the input stream, the input stream output from the meta-parser being passed to the parser;
- (b) lexically analyzing, by a processor, the input stream to provide a tokenized equivalent;
- (c) syntactically parsing, by the parser, the tokenized equivalent to provide a parser output; and
- (d) semantically analyzing, by the processor, the parser output to provide an indication of at least one of a personality classification, type, and function associated with the input stream.

19. The method of claim 18, wherein the input stream comprises contextual information, wherein the contextual information comprises a plurality of a descriptor of a physical action, a physical trait, a physical characteristic, a logical trait, a logical characteristic, a logical location, a spatial location, an identity, and a role and further comprising:
- (e) providing, by a user interface, the indication to a user.

20. The method of claim 18, wherein the input stream is defined by a plurality of grammars, wherein the plurality of grammars are associated with at least one of a plurality of personality classification systems, a plurality of personality types, and a plurality of personality functions and further comprising for a selected portion of the input stream:
- (e) determining a set of grammars potentially defining the input stream portion;
- (f) selecting a set of parsers, each parser set member being operable to parse according to at least one grammar set member; and
- (g) providing the input stream portion to at least one member of the set of parsers.

21. The method of claim 18, wherein the input stream is potentially defined by a plurality of grammars, wherein the plurality of grammars are associated with at least one of a plurality of personality classification systems, a plurality of personality types, and a plurality of personality functions, and further comprising:
- (e) determining that at least a portion of the input stream does not correspond to a known grammar;
- (f) in response, creating a grammar defining the at least a portion of the input stream;
- (g) performing at least one of the following sub-steps:
  - (g1) creating a parser operable to apply syntactical rules associated with the grammar;
  - (g2) creating a set of tokens associated with the created grammar; and
  - (g3) creating a semantic encoder operable to apply semantical rules associated with the grammar.

22. The method of claim 18, wherein at least some of the tokens in the tokenized equivalent are associated with one or more natural language words and wherein the input stream is defined by a plurality of grammars, each grammar being associated with the at least one of a personality classification, type, and function.

23. The method of claim 18, further comprising at least one of:
- (D1) providing to a recipient of the interpersonal communication a recommended response to the interpersonal communication, the recommended response reflecting at least one of a personality classification, type, and function determined to be associated with a source of the interpersonal communication;

(D2) providing to the recipient a description of at least one of a personality classification, type, and function determined to be associated with the source of the interpersonal communication;

(D3) providing to the source a recommended selection of words, phrases, and/or sentences to be used in the interpersonal communication, the recommendation reflecting at least one of a personality classification, type, and function determined to be associated with the recipient; and (D4) providing to the source a description of at least one of a personality classification, type, and function determined to be associated with the recipient of the interpersonal communication.

24. The method of claim 18, wherein, in step (d), at least one of a personality classification, type, and function associated with a source of the interpersonal communication is determined.

25. The method of claim 18, wherein step (d) outputs a personality dynamic associated with a source of the interpersonal communication and further comprising:

(e) selecting a set of user interface transformation rules; and (f) applying the personality dynamic to the set of user interface transformation rules to select a set of commands to provide to a user interface.

26. A computer readable medium comprising processor executable instructions operable to perform the steps of claim 18.

27. A method, comprising:

receiving a communication from an originator of the communication;

determining, by a meta-parser that performs a preliminary parse on one or more portions of the communication, a structure of the communication for either subsequent selection of a parser or subsequent creation of a parser, the meta-parser outputting the input stream and an indication of whether the meta-parser was able to successfully parse the communication, the communication output from the meta-parser being passed to the parser;

analyzing the communication, by a processor, to determine from the communication personality characteristics of the originator;

in response to the communication and the characteristics, indicating, by the processor, a form of a response to the communication that is compatible with the characteristics; and sending a response having the indicated form to the originator.

28. A non-transitory computer readable medium comprising processor executable instructions operable to perform the steps of claim 27.

* * * * *